Patented June 21, 1932

1,863,881

UNITED STATES PATENT OFFICE

LEO ROSENTHAL, OF VOHWINKEL, NEAR ELBERFELD, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

SYNTHETIC RESIN

No Drawing. Application filed November 22, 1927, Serial No. 235,117, and in Germany November 30, 1926.

The present invention concerns new and valuable synthetic resins and a process of preparing same. I have found that by causing crude solvent naphtha to be acted upon by ferric chloride in the presence of a phenol, new synthetic resins are obtainable. The requisite amount of phenol is dependent on the resinifiable substances present in the crude solvent naphtha (cumarone and indene). For example, when adding a quantity of a phenol corresponding to about 10% of the quantity of resinifiable substances, being present in the reaction mixture, resins of high melting point and completely soluble in heat-bodied oils are obtainable. By increasing the amount of phenol, resins soluble in heat-bodied oils are obtained, whose melting points are however lower. Suitable phenols are for example, phenol, cresols, naphthols and their homologues. The process can also be carried out by employing a crude solvent naphtha fraction boiling within higher limits (up to about 200° C.), containing considerably larger quantities of phenol-like bodies than the crude solvent naphtha customarily employed and boiling within the limits 160 to 180° C. My new resins when prepared from a mixture of a phenol-free crude solvent naphtha and a suitable homologue of phenol yield oil varnishes which do not change color at high temperatures.

It is to be understood that both methods of carrying out my process, adding the requisite quantity of a phenol to a phenol-free crude solvent naphtha and starting with a crude solvent naphtha containing phenol, fall within the scope of my invention.

The new products are slightly colored resins which are soluble in linseed oil, wood oil, and in heat-bodied oils. Their melting point depends on the relative proportions of phenol and resinifiable substance, used for the manufacture.

The reaction is advantageously carried out in such manner that the mixture of crude solvent naphtha (free from bases), and a phenol is vigorously stirred with ferric chloride (anhydrous or water containing) or ferric chloride solution at a tempeature of from 20 to 25° C. The formation of resin takes place with evolution of heat. Suitable cooling is provided by which a rise of the temperature of reaction to about 50° C. can be avoided.

In order to remove from the reaction liquid the iron contained therein it is diluted with suitable liquids e. g. benzene, xylene or purified solvent naphtha, and the liquid is separated from the precipitate and further treated with CaO and an activated or non-activated fuller's earth.

The following examples will illustrate the principles underlying my invention, which obviously are applicable with very wide variation:—

*Example 1.*—The starting material consists of a crude solvent naphtha, free from bases and boiling within the limits 160 to 185°C., and having a content of 3.4 per cent of phenols and 54 per cent of resinifiable constituents (cumarone and indene).

10 parts by weight of $\beta$-naphthol are dissolved in 500 parts by weight of this crude solvent naphtha and into this solution a solution of 83 parts by weight of crystallized ferric chloride ($FeCl_3.6$ aq) and 5 parts by weight of water are gradually introduced with continuous vigorous stirring. The stirring is continued for a period of from 6 to 7 hours and the whole is then diluted with 500 parts by weight of purified solvent naphtha, xylene or the like. The resin solution freed from ferric chloride solution is then stirred up for some time with about 25 parts by weight of quicklime with the addition of activated or non-activated fuller's earth at first in the cold and then whilst heating to about 90 to 95° C. The solvent is removed from the filtered resin solution by distillation, advantageously in vacuo. A light resin is thus obtained as the residue, which begins to sinter at about 125° C. and melts at 152° C.; it is completely soluble in linseed oil, wood oil and in very highly viscous heat-bodied oils.

*Example 2.*—780 parts by weight of a crude solvent naphtha, free from bases and boiling at from 170° C. to 195° C., possessing a phenol content of 5.5 per cent and containing 57 per cent of resinifiable constituents, are stirred up for about 5 hours with 80 to 100 parts by weight of crystallized ferric chloride (FeCl₃.6 aq). The initial temperature of reaction of about 24° C. rises during the reaction to about 49° C. When the reaction is complete the mass is diluted with 800 parts by weight of xylene and worked up according to the directions given in Example 1. 409 parts by weight of a light resin are thus obtained, melting at about 150° C. and exhibiting the same solubility properties as the product obtained according to Example 1.

Example 3.—26 parts by weight of crude cresol are dissolved in 450 parts by weight of a crude solvent naphtha, boiling between 164–185° C., which has been freed from phenols and bases and possesses a content of 51.9 percent of resinfiable constituents.

About 30 to 45 parts by weight of molten crystallized ferric chloride (FeCl₃.6 aq) are caused to flow into this mixture with vigorous stirring at an initial temperature of 25° C. The reaction soon commences accompanied by a considerable rise in temperature. Stirring is continued for a further period of 6 to 8 hours during which time care is taken, if desired, to prevent the temperature of reaction exceeding 52° C. When the reaction is complete dilution is effected by adding 200 to 300 parts by weight of xylene, the solution is freed from ferric chloride and worked up according to the directions of Example 1. A light resin is obtained, melting at 140° C., and completely soluble in heat-bodied linseed oil and in heat-bodied oil obtained from a mixture of linseed oil and wood oil.

An identical product is obtained by replacing the crystallized ferric chloride in this example by 4 parts by weight of anhydrous ferric chloride.

I claim:

1. In the process for the manufacture of synthetic resins the step which comprises treating crude solvent naphtha to which a phenol is added, with ferric chloride.

2. In the process for the manufacture of synthetic resins the step which comprises treating crude solvent naphtha free from bases, to which a phenol is added, with ferric chloride.

3. The new synthetic resins obtainable from solvent naphtha and a phenol by treatment with ferric chloride, being slightly colored resin-like products soluble in linseed oil, wood oil, and in heat-bodied oils.

4. The new synthetic resin obtainable from crude solvent naphtha free from bases and about 10% of phenol, calculated on the quantity of the resinifiable substances present in the solvent naphtha, by treatment with ferric chloride, being a slightly colored resin-like product, soluble in linseed oil, wood oil and heat-bodied oils.

5. The process which comprises treating crude solvent naphtha to which a phenol has been added, with ferric chloride, diluting the reaction mixture with a liquid aromatic hydrocarbon, separating the liquid from the precipitate formed, and treating the liquid with calcium oxide and with fuller's earth.

6. The process which comprises stirring for several hours crude solvent naphtha to which at least about 10% of a phenol, calculated on the quantity of resinifiable substances present in the reaction mixture, are added with ferric chloride at a temperature between about 20 and 50° C., diluting the reaction mixture with a liquid aromatic hydrocarbon, separating the liquid from the precipitate formed, and treating the liquid with calcium oxide and with fuller's earth.

7. The process which comprises stirring for several hours crude solvent naphtha free from bases to which at least about 10% of a phenol, calculated on the quantity of resinifiable substances present in the reaction mixture, are added with ferric chloride at a temperature between about 20 and 50° C., diluting the reaction mixture with a liquid aromatic hydrocarbon, separating the liquid from the precipitate formed, and treating the liquid with calcium oxide and with fuller's earth.

8. The process which comprises stirring for several hours a crude solvent naphtha free from bases and boiling between about 160 and 195° C. to which about 10% of phenol, calculated on the quantity of resinifiable substances present in the reaction mixture, are added, with ferric chloride at a temperature between about 20 to 50° C., diluting the reaction mixture with xylene separating the liquid from the precipitate formed, and treating the liquid with calcium oxide and with fuller's earth.

In testimony whereof I have hereunto set my hand.

LEO ROSENTHAL.